US008267294B2

(12) United States Patent
Yu et al.

(10) Patent No.: US 8,267,294 B2
(45) Date of Patent: *Sep. 18, 2012

(54) METHOD AND APPARATUS FOR ATTACHING A PERSONAL ELECTRONIC DEVICE

(76) Inventors: David Chen Yu, Laguna Niguel, CA (US); Michael D. Yu, Laguna Niguel, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/795,327

(22) Filed: Jun. 7, 2010

(65) Prior Publication Data

US 2011/0297720 A1    Dec. 8, 2011

(51) Int. Cl.
*A45F 5/00*    (2006.01)
(52) U.S. Cl. .......................... 224/623; 224/625; 224/930
(58) Field of Classification Search .................. 224/197, 224/623, 606, 625, 270, 930, 910, 922, 261, 224/262, 661, 925; 361/679.03; 84/421; 348/825
See application file for complete search history.

(56) References Cited

U.S. PATENT DOCUMENTS

| | | | | |
|---|---|---|---|---|
| 3,661,308 A * | 5/1972 | Walters | ......................... | 224/258 |
| 4,637,536 A * | 1/1987 | Wong | ........................... | 224/262 |
| 5,207,791 A * | 5/1993 | Scherbarth | ............... | 273/148 B |
| 5,503,313 A * | 4/1996 | Wei | ............................... | 224/197 |
| 5,664,750 A * | 9/1997 | Cohen | ....................... | 248/231.71 |
| 6,359,609 B1 * | 3/2002 | Kuenster et al. | ............ | 345/156 |
| 7,641,046 B2 * | 1/2010 | Tsang et al. | ................. | 206/320 |
| 7,665,641 B2 * | 2/2010 | Kaufman | ..................... | 224/261 |
| 8,056,780 B1 * | 11/2011 | Bruns | ........................... | 224/163 |
| 2005/0092791 A1 * | 5/2005 | Labarca et al. | .............. | 224/269 |
| 2006/0138301 A1 * | 6/2006 | Kaufman | ..................... | 248/682 |
| 2008/0083631 A1 * | 4/2008 | Tsang et al. | ................. | 206/320 |

* cited by examiner

*Primary Examiner* — Justin Larson
(74) *Attorney, Agent, or Firm* — Tran & Associates

(57) ABSTRACT

A method and apparatus for supporting a personal electronic device are provided. The device incorporates a support frame structure comprised of three legs. A vertical leg is attached to a shoulder strap, while the horizontal legs are attached to a chest strap. A lower joint is located between the two horizontal legs and this lower joint is also attached to an electronic device support leg. The electronic device support leg is attached to the lower joint and also to a ball joint at the end opposite the lower joint. In use, the lower joint allows for the electronic device to be moved into a viewing position at a desired angle. The ball joint allows rotation of the device between portrait and landscape orientations. A case may also be attached to the electronic device support leg to contain the personal electronic device.

12 Claims, 3 Drawing Sheets

METHOD AND APPARATUS FOR ATTACHING A PERSONAL ELECTRONIC DEVICE

BACKGROUND OF THE INVENTION

The present invention pertains to a method and apparatus for attaching a personal electronic device.

Personal electronic devices have become extremely popular, providing on-the-go entertainment and data access. While many devices are hand-held size, the popularity of these devices has led to the introduction of larger tablet-style devices with larger screens. These larger devices may also allow a user to access the Internet using a keyboard appearing on the screen.

Tablet-style personal electronic devices may require a user to use both hands, particularly when trying to enter data on the on-screen keyboard. Because these devices are larger, a user may need to place the device on a table to enter the data. In addition, the larger size of these devices may cause a user's hands and arms to become tired when holding the device for a long period of time, such as when viewing a movie.

One reason for the great popularity of tablet-style personal electronic devices is their portability. Smaller than a laptop, tablet-style devices feature screens that may be difficult to view under direct light or sunlight. In this situation the user may be forced to hold the device in an uncomfortable position in order to have the best viewing quality on the screen.

There is a need in the art for a method and apparatus for supporting a tablet style personal electronic device. Particularly desirable is an apparatus and method of attaching a tablet style personal electronic device to a user for hands-free use.

SUMMARY OF THE INVENTION

An apparatus for supporting an electronic device is provided in an embodiment. The attachment system includes a shoulder strap attached to a vertical leg of a support frame. A chest strap is also provided and is attached to two horizontal legs of the support frame. A lower joint is located between the two horizontal legs of the support frame. This lower joint allows the user to adjust the viewing angle of the screen of the electronic device. The electronic device attaches to an electronic device support leg that is attached to the lower joint. The end opposite the lower joint incorporates a ball joint. The ball joint allows the user to rotate the screen.

A method of supporting and attaching an electronic device is provided in a further embodiment. The method includes attaching an electronic device to an electronic device support leg, the support leg itself attached to a support frame. The user then adjusts the electronic device to the desired viewing position.

A further embodiment provides means for attaching an electronic device to an electronic device support leg attached to a support frame and means for adjusting the electronic device to a viewing position.

Various aspects and embodiments of the invention are described in further detail below.

BRIEF DESCRIPTION OF THE SEVERAL VIEWS OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

DETAILED DESCRIPTION OF THE INVENTION

Figure 1:
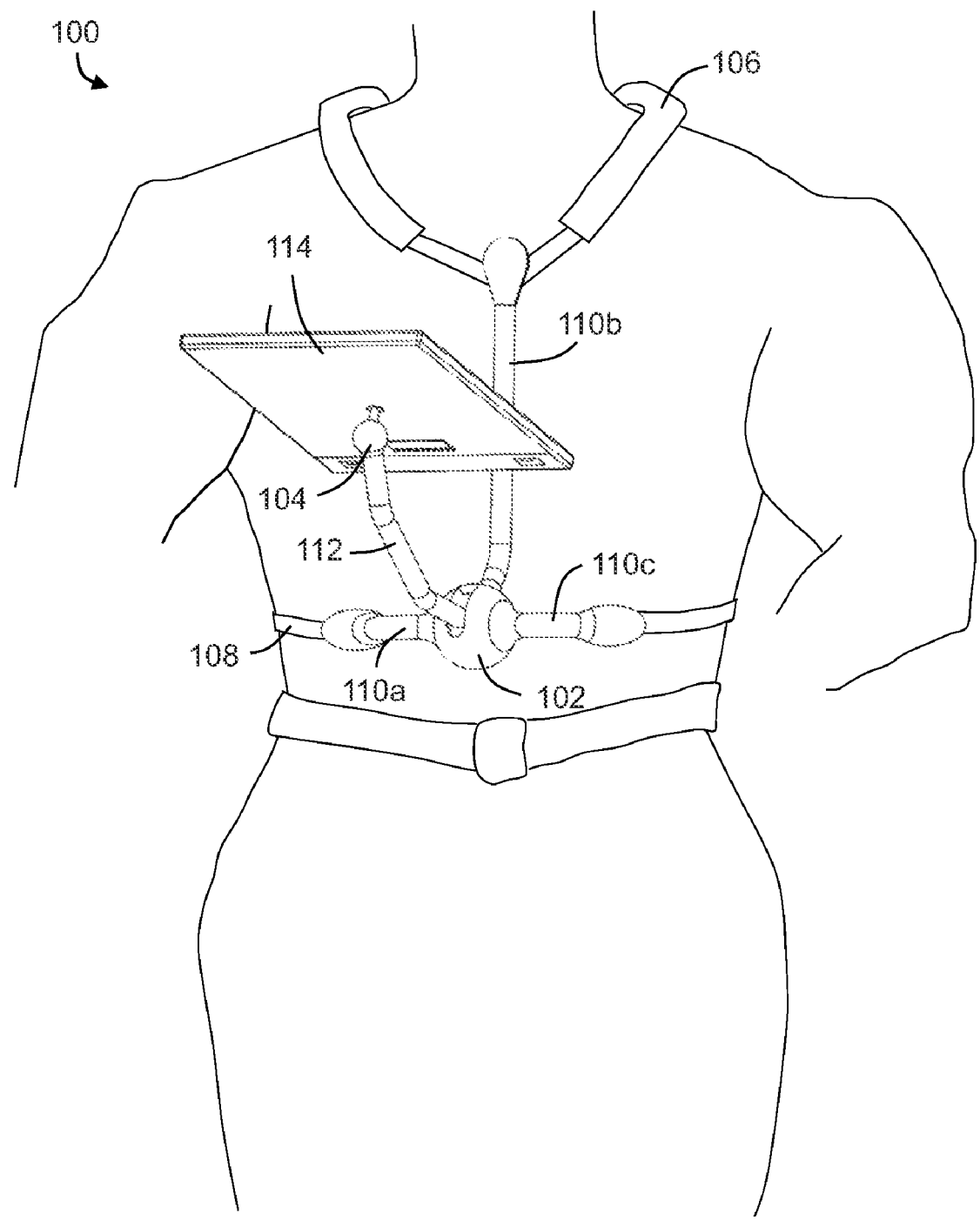
FIG. 1 illustrates use of the attachment system for a tablet style personal electronic device, according to an embodiment of the invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides for an efficient and convenient apparatus for hands-free use of a tablet style personal electronic device or other personal electronic device. The attachment system frees both hands to use the tablet-style personal electronic device. With the device supported by the attachment system of the present invention the user is free to type or move about.

FIG. 1 illustrates use of the device. The attachment system 100 includes lower joint 102, which provides a mechanism to raise and lower the tablet-style device 114 to adjust the viewing angle. Lower joint 102 is attached to two support legs 110a and 110c. When worn, support legs 110a and c are horizontal and generally parallel to the user's waist. Lower joint 102 allows movement in an up and down direction only, allowing adjustment of the screen viewing angle. The lower joint 102 is a friction hinge, allowing the user to set a position and have the tablet-style device 114 remain in the set position. Lower joint 102 also allows the tablet-style personal electronic device to be pushed against the user's chest to carry the device without concern of dropping it.

Lower joint 102 moves a tablet support leg 112 up and down. Tablet support leg 112 incorporates a ball joint 104 at the end of the tablet support leg 112 opposite lower joint 102. Ball joint 104 is a friction ball joint that allows rotation. Friction provides stabilization after the device is rotated. If needed a lock may be provided in ball joint 104. Since many tablet-style personal electronic devices may be used in either portrait or landscape orientation, the friction ball joint 104 permits a user to rotate the device to whichever orientation is necessary for the application in use.

The attachment system 100 is further stabilized by a support leg 110b, which forms the third leg of the support system, along with support legs 110a and c. Support leg 110b is longer and extends vertically up the user's chest. In contrast, support legs 110a and c extend horizontally as depicted in FIG. 1. Further stabilization and support for the attachment system is provided by shoulder strap 106. Shoulder strap 106 attaches to the upper end of support leg 110b. When worn support leg 110b and shoulder strap 106 form a "Y" pattern on the wearer's chest. Both chest strap 108 and shoulder strap 106 are adjustable to fit each user.

Figure 2:
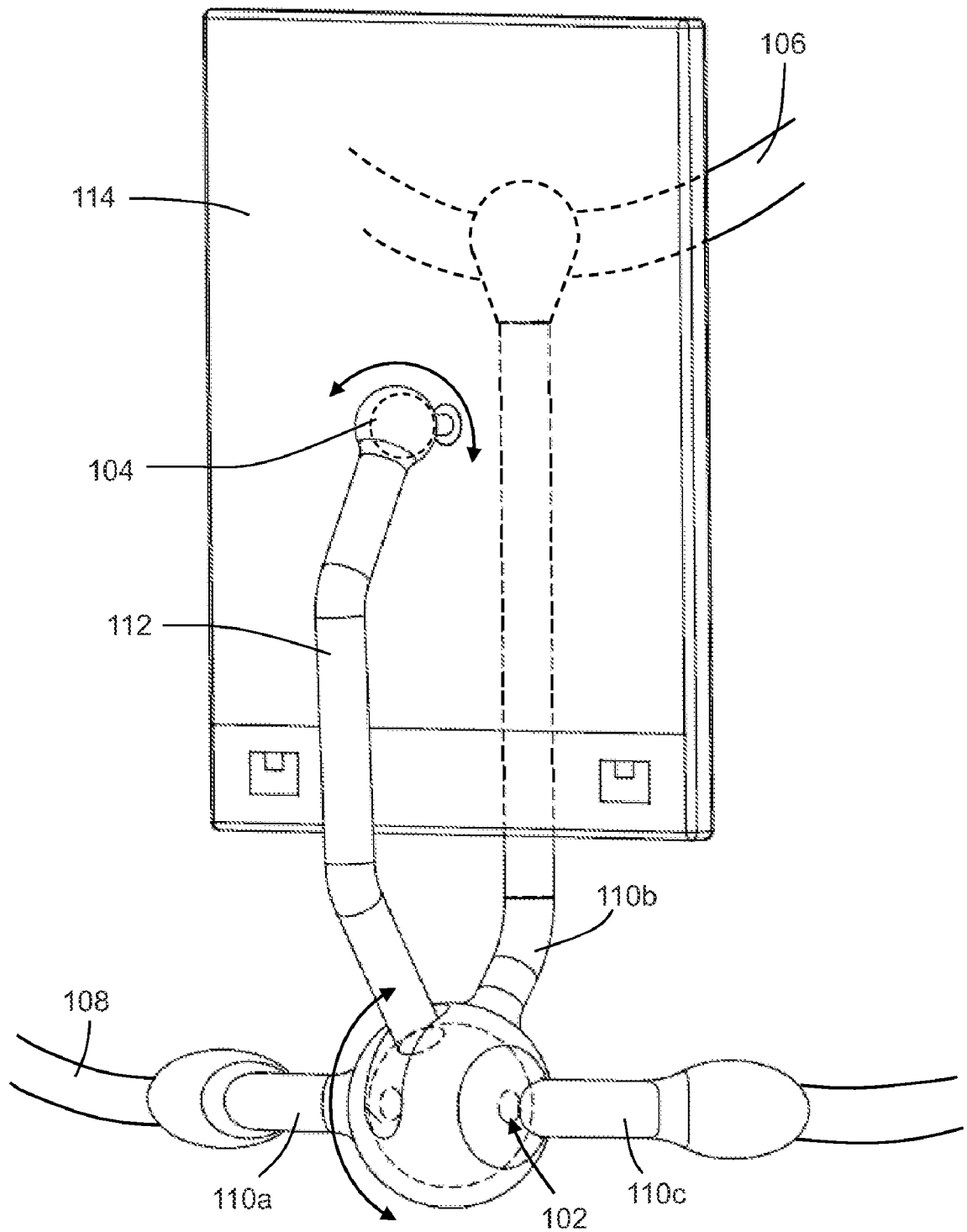
FIG. 2 provides a detailed view of the lower joint and ball joint of the attachment system for a tablet style personal electronic device according to an embodiment of the invention.

FIG. 2 illustrates the attachment system from the perspective of a user wearing the device. In FIG. 2, the tablet-style personal electronic device or other electronic device is shown in the carrying position that is pushed up against the user's chest with the back of the device facing outward. In use, the tablet-style personal electronic device 114 is moved into the viewing position so that the screen is visible to the user. The double-headed arrow in FIG. 2 illustrates the direction of motion for lower joint 102. The chest strap 108 attaches to support legs 110a and 110c. This attachment may be by a variety of means, including but not limited to: threaded loop and stitching/gluing, clips, buckles, or other means. Support leg 110b is partially visible near the lower joint 102. Tablet support leg 112 is also attached to lower joint 102. Friction ball joint 104 attaches to the back of the tablet-style personal electronic device 114. This attachment to ball joint 104 may be by means of a pad with adhesive attached, but could also utilize a flat plate with straps to hold the device to the plate, or by means of a case. Any suitable means is contemplated. The double-headed arrow shown near friction ball joint 104 illustrates the direction of rotational movement of friction ball joint 104. Ball joint 104 allows further adjustment of the viewing angle and distance and also allows unlimited horizontal rotation of the screen.

Figure 3:
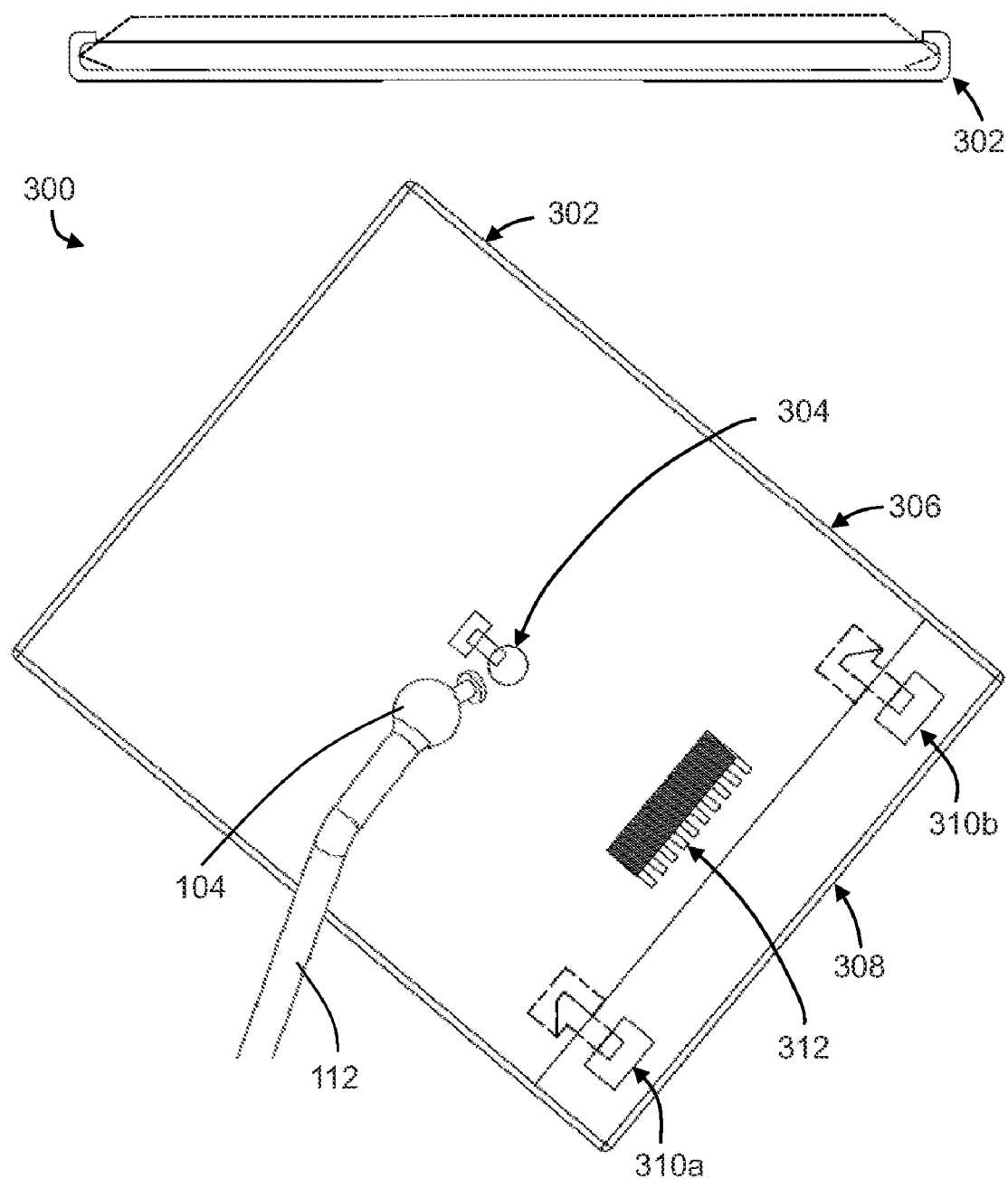
FIG. 3 depicts use of a case with the attachment system for a tablet style personal electronic device, according to an embodiment of the invention.

FIG. 3 illustrates use of a case that may be used in conjunction with the attachment system for a tablet style personal electronic device. The assembly 300, includes a case 302 that is attached to the shaft 112 of the ball joint 104. Case 302 may be detached and used separately. Case 302 may also be used as a cover by inserting the tablet style personal electronic device with the cover facing down. The connection between ball joint 104 and the back of case 302 may be locked in place using built in pin 304, located on the back of case 302.

Lower portion 306 of case 302 may be separated to allow insertion of the tablet style personal electronic device. Locks 310a and 310b lock the tablet style personal electronic device in case 302. Indented handle 312 allows carrying of case 302.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for supporting an electronic device, comprising:
    a support frame including:
        a lower joint;
        a first cylindrical leg connected at a first end thereof to the lower joint and projecting vertically from the lower joint;
        a second cylindrical leg connected at a first end thereof to the lower joint and projecting horizontally away from a first side of the lower joint;
        a third cylindrical leg connected at a first end thereof to the lower joint and projecting horizontally away from a second side opposite the first side of the lower joint; and
        an electronic device support leg pivotally connected at a first end thereof to the lower joint and having a ball joint at a second end thereof for attachment to the electronic device; and
    a strap system including:
        a shoulder strap attached to a second end of the first cylindrical leg;
        a chest strap having first and second ends attached to respective second ends of the second and third cylindrical legs.

2. The apparatus of claim 1, wherein the lower joint is a friction joint.

3. The apparatus of claim 1, wherein the lower joint includes a locking mechanism.

4. The apparatus of claim 1, wherein the ball joint is a friction ball joint.

5. The apparatus of claim 1, wherein the ball joint includes a locking mechanism.

6. The apparatus of claim 1, wherein the lower joint and the ball joint are friction joints.

7. The apparatus of claim 1, wherein the lower joint and the ball joint include locking mechanisms.

8. The apparatus of claim 1, further comprising a case with locking pin and handle for attachment to the ball joint.

9. The apparatus of claim 1, wherein the case functions as a cover.

10. A method for supporting an electronic device, comprising:
    providing a support frame including:
        a lower joint;
        a first cylindrical leg connected at a first end thereof to the lower joint and projecting vertically from the lower joint;
        a second cylindrical leg connected at a first end thereof to the lower joint and projecting horizontally away from a first side of the lower joint;
        a third cylindrical leg connected at a first end thereof to the lower joint and projecting horizontally away from a second side opposite the first side of the lower joint; and
        an electronic device support leg pivotally connected at a first end thereof to the lower joint and having a ball joint at a second end thereof;
    providing a strap system including:
        a shoulder strap attached to a second end of the first cylindrical leg;
        a chest strap having first and second ends attached to respective second ends of the second and third cylindrical legs; and
    attaching the electronic device to the ball joint of the support leg.

11. The method of claim 10, further comprising:
    adjusting the electronic device to a viewing position using the lower joint and the ball joint.

12. The method of claim 10, further comprising inserting the electronic device into a case, wherein the case may be attached to the support leg attached to the support frame.

* * * * *